(No Model.)
A. H. FORST.
HOSE CLAMP AND PATCH.
No. 549,774. Patented Nov. 12, 1895.
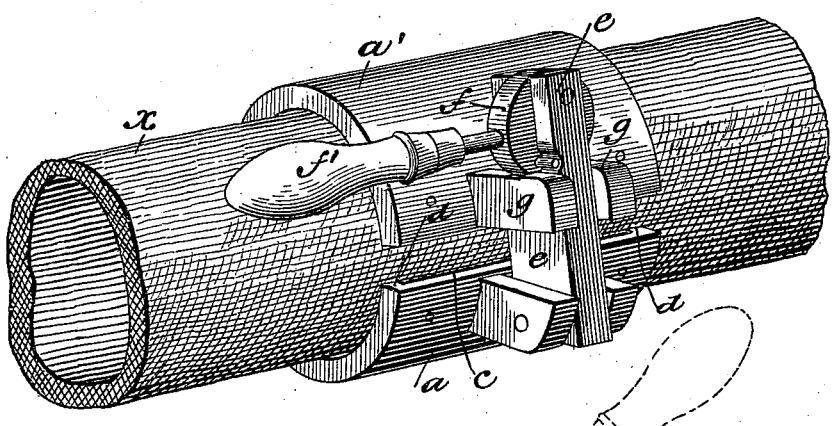
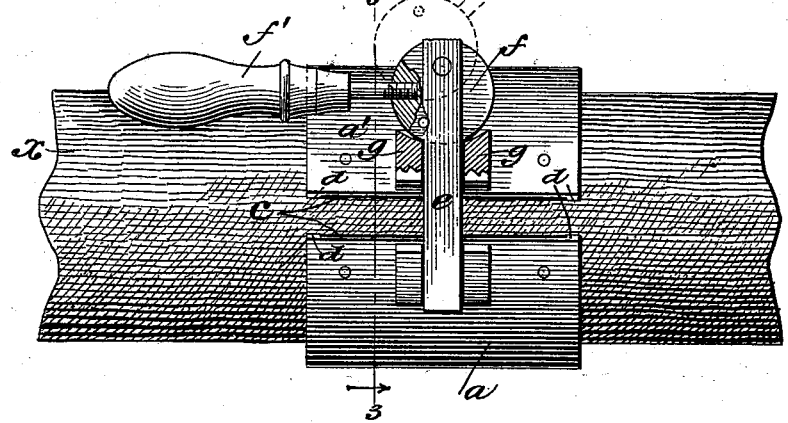
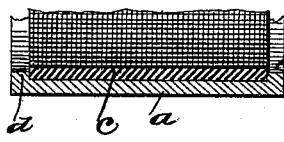
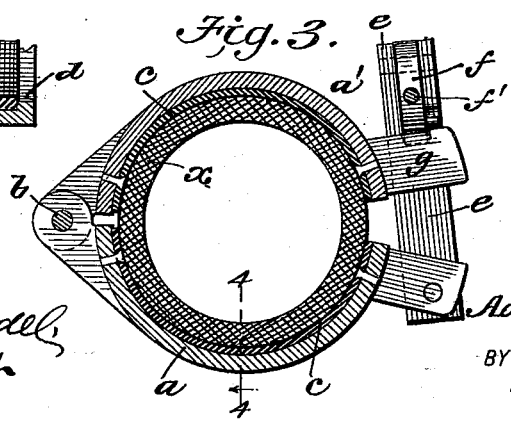
WITNESSES:
M. D. Blondel
Amos W. Hart
INVENTOR:
Aaron H. Forst.
BY Munn & Co.
ATTORNEYS

UNITED STATES PATENT OFFICE.

AARON H. FORST, OF LOUISVILLE, KENTUCKY, ASSIGNOR OF ONE-HALF TO GEORGE W. HESS, OF SAME PLACE.

HOSE CLAMP AND PATCH.

SPECIFICATION forming part of Letters Patent No. 549,774, dated November 12, 1895.

Application filed July 6, 1895. Serial No. 555,152. (No model.)

*To all whom it may concern:*

Be it known that I, AARON H. FORST, of Louisville, in the county of Jefferson and State of Kentucky, have invented a new and Improved Hose Clamp and Patch, of which the following is a specification.

My invention is an improved clamp and patch for temporarily closing or repairing burst or otherwise ruptured hose used by the fire department of towns and cities. It is also adapted for stopping leaks in smaller hose—such as is used for sprinkling streets, lawns, and gardens—and is likewise applicable to steam and water pipes for the same purpose.

The invention is embodied in the means whereby the two semicircular parts of the clamp are locked together.

In the accompanying drawings, Figure 1 is a perspective view of my device applied to a section of hose. Fig. 2 is a side view of the same. Fig. 3 is a cross-section on line 3 3 of Fig. 2. Fig. 4 is a detail cross-section on line 4 4 of Fig. 3.

The body of the hose clamp and patch consists of two narrow semicircular cast-metal parts $a$ $a'$, which are connected by a hinge $b$, composed of a pintle and perforated lugs, as shown. Each of the parts $a$ $a'$ is lined interiorly with rubber $c$, which is both cemented and riveted in place. The parallel curved side edges of the said parts are provided with a rib or flange $d$, that prevents the elastic lining from spreading laterally when the clamp is applied to a hose or pipe. Such ribs have their inner sides at right angles to the side of the clamp and confine the packing, as shown in Fig. 4.

The locking device consists, chiefly, of a bar $e$, pivoted or hinged to the free end of the part $a$, a cam $f$, pivoted to the free end of said bar and having a lever-arm and shouldered lugs or catches $g$ fixed on the free edge of the other semicircular part $a'$, as shown. The cam $f$ is circular in form and pivoted eccentrically in an endwise slot formed in the free end of bar $e$. The lugs $g$ are separated to receive the bar $e$ between them and have curved notches formed in the side which is farthest from the adjacent edge of the part $a$, and the edge of the cam $f$ is adapted to fit in said notches, as shown. As a means for rotating the cam for locking and unlocking the clamp, it is provided with a lateral lever-arm $f'$, which may be a permanent attachment thereof; but it is preferably made detachable, and for this purpose its inner end is screw-threaded and adapted to fit in a threaded socket in the cam $f$, as shown in Fig. 2.

The clamp is used as follows: To close a punctured or ruptured portion of a hose $x$, it is opened and applied to the latter either just above or below the opening therein and the semicircular parts $a$ and $a'$ are simply closed or brought together without being locked. The clamp is then slid along the hose and adjusted so that one of the said parts $a$ or $a'$ covers the opening when the stream of water escaping from the latter is diverted laterally and flows out at the ends of the clamp, and the cam $f$ being then turned quickly it engages the notches in the lugs $g$ and draws the parts $a$ $a'$ close together, so that they compress the hose firmly and wholly prevent further leakage. This result is due to radial expansion of the hose under the pressure of water against the elastic packing or lining of the clamp and to the unyielding contact of the ribs or flanges $d$ with the hose on opposite sides of the opening in the hose. The clamp thus constitutes a cheap and durable hose-patch, which may be easily and quickly applied, and is very efficient in use.

When the clamp is designed for use on steam or hot-water pipes, the packing or lining is preferably made of some material other than rubber, and for this purpose I propose to employ asbestos.

It is obvious the clamp may be applied to hose or pipe in any position, horizontal or vertical.

The parts composing the clamp may be made of various metals; but I prefer steel, as combining the best qualities.

What I claim is—

In a hose clamp, the combination, with the semi-circular parts, having lugs as specified, of the hinged bar, a circular cam pivoted eccentrically to said bar, and provided with a stop that comes in contact with the bar, and a lever arm which is detachably connected with the cam, as shown and described.

AARON H. FORST.

Witnesses:
GEORGE W. HESS,
JOHN R. PFLANZ.